United States Patent
Jung et al.

(10) Patent No.: US 10,181,788 B2
(45) Date of Patent: Jan. 15, 2019

(54) RATIONAL CONVERSION RATIO CONVERTER

(71) Applicant: The Regents of the University of Michigan

(72) Inventors: Wanyeong Jung, Ann Arbor, MI (US); Dennis Michael Chen Sylvester, Ann Arbor, MI (US); David Theodore Blaauw, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 299 days.

(21) Appl. No.: 15/011,242

(22) Filed: Jan. 29, 2016

(65) Prior Publication Data
US 2017/0222538 A1   Aug. 3, 2017

(51) Int. Cl.
*H02M 3/07* (2006.01)
*H02M 1/00* (2006.01)

(52) U.S. Cl.
CPC ........ *H02M 3/07* (2013.01); *H02M 2001/007* (2013.01); *H02M 2003/071* (2013.01); *H02M 2003/072* (2013.01)

(58) Field of Classification Search
CPC ..................... H02M 3/07–2003/078
USPC ..................... 363/59, 60; 327/536
See application file for complete search history.

(56) References Cited

U.S. PATENT DOCUMENTS

| | | | |
|---|---|---|---|
| 8,981,838 B1 * | 3/2015 | Chuang | H02M 3/07 327/536 |
| 2006/0119438 A1 * | 6/2006 | Lin | H03L 7/0896 331/16 |
| 2007/0188242 A1 * | 8/2007 | Song | H03L 7/0898 331/16 |
| 2008/0218250 A1 | 9/2008 | Kimura et al. | |
| 2009/0072800 A1 | 3/2009 | Ramadass et al. | |
| 2014/0043010 A1 | 2/2014 | Salem | |

OTHER PUBLICATIONS

"12.1 A rational-conversion-ratio switched-capacitor DC-DC converter using negative-output feedback," 2016 IEEE International Solid-State Circuits Conference (ISSCC), San Francisco, CA, 2016, pp. 218-219. Jan. 31-Feb. 4, 2016.*

(Continued)

*Primary Examiner* — Kyle J Moody
*Assistant Examiner* — Peter Novak
(74) *Attorney, Agent, or Firm* — Pramudji Law Group PLLC; Ari Pramudji

(57) ABSTRACT

Various implementations described herein are directed to an integrated circuit. The integrated circuit may include a first voltage source providing a first voltage having a first polarity. The integrated circuit may include a second voltage source providing a second voltage having a second polarity that is opposite the first polarity. The integrated circuit may include a first circuit portion configured to receive the first and second voltages and provide one or more feedback voltages. The integrated circuit may include a second circuit portion configured to receive the first and second voltages along with the one or more feedback voltages and provide an output voltage that is proportional to the first voltage based on a rational conversion ratio that is derived by selection of at least one of the first and second voltages and the one or more feedback voltages.

20 Claims, 9 Drawing Sheets

(56) References Cited

OTHER PUBLICATIONS

PCT International Search Report and Written Opinion; PCT/US2017/015516; May 3, 2017.

Salem et al.; A Battery-Connected 24-Ratio Switched Capacitor PMIC Achieving 95.5%-Efficiency; 2015 VLSI; IEEE; Jun. 2015. DOI: 10.1109/VLSIC.2015.7231315.

Jiang et al.; A 2-/3-Phase Fully Integrated Switched-Capacitor DC-DC Converter in Bulk CMOS for Energy-Efficient Digital Circuits with 14% Efficiency Improvement; 2015 ISSCC; IEEE; Feb. 2015. DOI: 10.1109/ISSCC.2015.7063078.

Salem, et al.; An 85%-Efficiency Fully Integrated 15-Ratio Recursive Switched-Capacitor DC-DC Converter with 0.1-to-2.2V Output Voltage Range; 2014 ISSCC; IEEE; Feb. 2014. DOI: 10.1109/ISSCC.2014.6757350.

Le et al.; A Sub-ns Response Fully-Integrated Battery-Connected Switched-Capacitor Voltage Regulator Delivering 0.19W/mm2 at 73% Efficiency; 2013 ISSCC; IEEE; Feb. 2013. DOI: 10.1109/ISSCC.2013.6487775.

Bang, et al.; A Fully Integrated Successive-Approximation Switched-Capacitor DC-DC Converter with 31mV Output Voltage Resolution; 2013 ISSCC; IEEE; Feb. 2013. DOI: 10.1109/ISSCC.2013.6487774.

\* cited by examiner

RATIONAL CONVERSION RATIO CONVERTER

BACKGROUND

This section is intended to provide information relevant to understanding various technologies described herein. As the section's title implies, this is a discussion of related art that should in no way imply that it is prior art. Generally, related art may or may not be considered prior art. It should therefore be understood that any statement in this section should be read in this light, and not as any admission of prior art.

Generally, a voltage converter refers to an electric power converter that changes a voltage of an electrical power source. Some voltage converters may be implemented as DC-DC voltage converters with fixed conversion ratios. Some DC-DC voltage converters may be implemented with binary conversion ratios.

FIG. 1 illustrates a diagram of a conventional fixed-ratio binary converter 100 as known in the art. As shown, a first source voltage VDD and a second source voltage VSS are provided as inputs to multiple multiplexers MUX_1, MUX_1, . . . , MUX_N. The output of first MUX_1 is provided to a first converter 1 along with the second source voltage VSS. The output of second MUX_2 is provided to a second converter 2 along with the output of the first converter 1. The output of last MUX_N is then provided to a last converter N along with the output of the second converter 2. The output of the last MUX_N is the provided as an output voltage $V_{OUT}$.

In this manner, this conventional binary converter 100 is configured to generate binary conversion ratios but is unable to effectively generate arbitrary conversion ratios with high resolution. Also, this conventional binary converter 100 is somewhat inefficient in maintaining output conductance when compared to fixed-ratio converters.

BRIEF DESCRIPTION OF THE DRAWINGS

Implementations of various techniques are described herein with reference to the accompanying drawings. It should be understood, however, that the accompanying drawings illustrate only various implementations described herein and are not meant to limit embodiments of various techniques described herein.

DETAILED DESCRIPTION

Various implementations described herein are directed to a voltage converter that may be configured to generate any arbitrary rational conversion ratio. For instance, various implementations described herein may refer to a ratio-reconfigurable switched-capacitor (SC) DC-DC converter that may be configured to generate any arbitrary rational ratio, such as, e.g., any rational conversion ratio. Thus, this converter may be referred to as a rational-conversion-ratio SC DC-DC converter. Further, in some implementations, the voltage converter described herein may be configured to implement use of negative feedback voltage to generate any arbitrary rational ratios or any rational conversion ratios. Further, in some implementations, the negative feedback voltage may be used to supply output current that assists with maintaining output conductance at or at least near similar levels as a conventional fixed-ratio converter. Hence, various implementations of voltage converters described herein may be configured to provide rational conversion ratio re-configurability with simple configuration schemes, while maintaining output conductance, thus overcoming deficiencies of conventional fixed-ratio converters.

Various implementations of providing ratio-reconfigurable converters will now be described in greater detail herein with reference to FIGS. 2-8.

Figure 1:
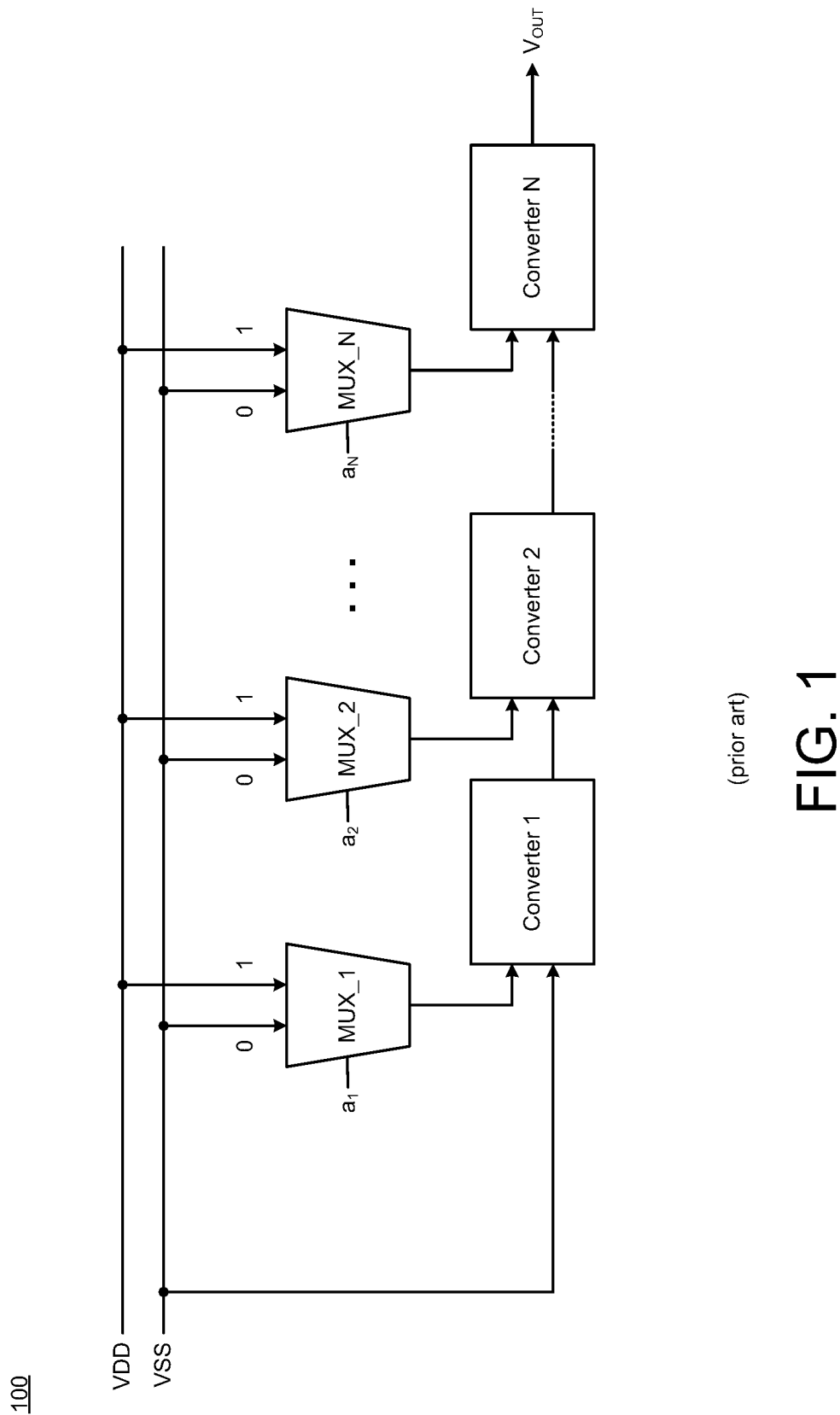
FIG. 1 illustrates a diagram of a conventional fixed-ratio binary converter as known in the art.
Figure 2:
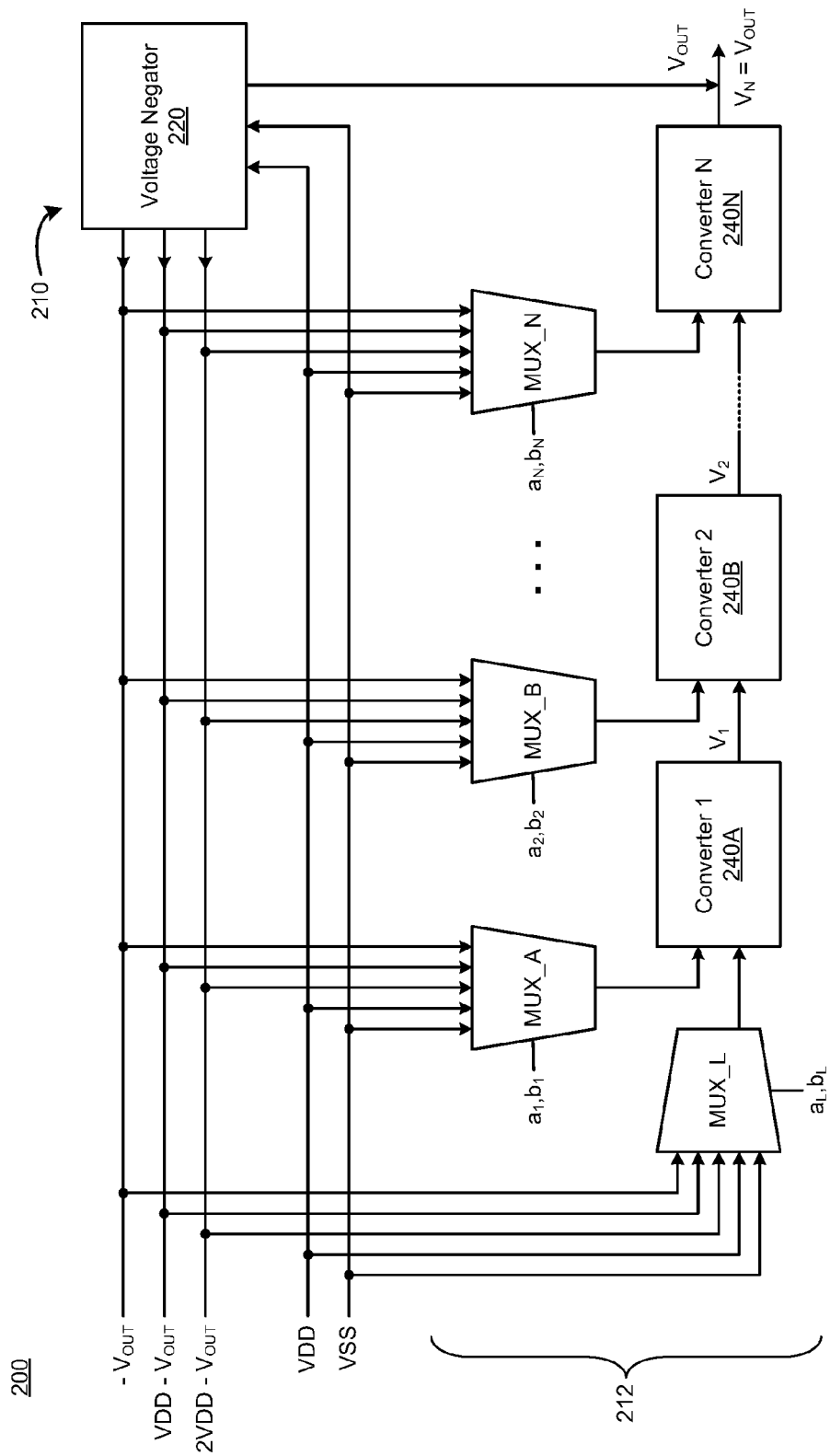
FIG. 2 illustrates a diagram of a rational-reconfigurable DC-DC converter, in accordance with various implementations described herein.

FIG. 2 illustrates a diagram of a rational-reconfigurable DC-DC converter 200, in accordance with various implementations described herein.

The converter 200 of FIG. 2 may be implemented as an integrated circuit, as components on a printed circuit board (PCB), and/or any other similar circuitry. In some cases, the converter 200 may be implemented as a device, apparatus, etc. having an integrated circuit, having components on a printed circuit board (PCB), and/or having any other similar circuitry. Generally, in reference to manufacturing and fabrication processes, electronic designers may employ various techniques to design integrated circuits, PCBs, and other similar circuitry, such as physical chips and/or physical layers.

The converter 200 may include a first voltage source providing a first voltage VDD having a first polarity, such as a positive polarity (+). The converter 200 may include a second voltage source providing a second voltage VSS having a second polarity that is opposite the first polarity, such as a negative polarity (−). In some implementations, the second source voltage may be at or near a ground voltage (GND), and the second source voltage may be a positive or negative voltage having a positive or negative polarity with a magnitude at or near zero volts (0V).

The converter 200 may include a first circuit portion 210 that may be configured to receive the first and second voltages VDD, VSS and provide one or more feedback voltages, such as, e.g., one or more negative feedback voltages (e.g., $-V_{OUT}$, VDD $-V_{OUT}$, 2VDD $-V_{OUT}$). The first circuit portion 210 may be implemented as a voltage negator 220 that is configured to receive the first and second voltages VDD, VSS and provide the one or more negative feedback voltages (e.g., $-V_{OUT}$, VDD $-V_{OUT}$, 2VDD $-V_{OUT}$).

In some cases, the one or more negative feedback voltages may include a first negative feedback voltage that is similar to a negative output voltage ($-V_{OUT}$), wherein the negative output voltage ($-V_{OUT}$) may have a magnitude similar to the positive output voltage ($V_{OUT}$) with an opposite polarity (–). The one or more negative feedback voltages may include a second negative feedback voltage that is a sum of the positive source voltage and a negative output voltage (VDD $-V_{OUT}$). The one or more negative feedback voltages may include a third negative feedback voltage that is a sum of double the positive source voltage and a negative output voltage (2VDD $-V_{OUT}$).

Figure 3:
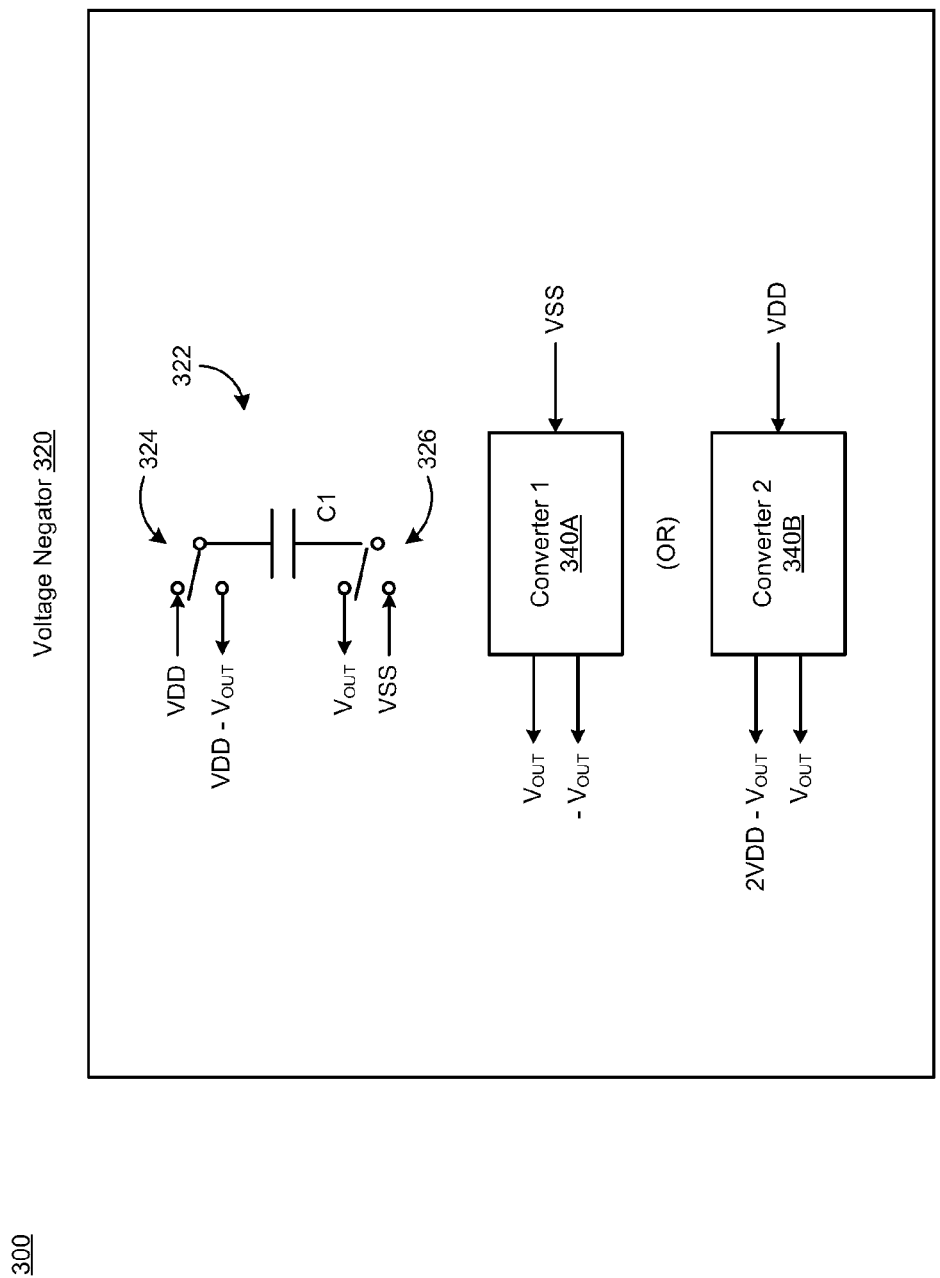
FIG. 3 illustrates a diagram of a voltage negator, in accordance with various implementations described herein.

FIG. 3 illustrates a diagram 300 of a voltage negator 320, in accordance with various implementations described herein. The voltage negator 320 of FIG. 3 may be implemented as the voltage negator 220 of FIG. 2.

As shown in FIG. 3, the voltage negator 320 may include a switched capacitor network 322 having at least one capacitor C1 interposed between an upper switch 324 and a lower switch 326. The upper switch 324 may provide for switching between the first voltage VDD as an input voltage and at least one of the negative feedback voltages (e.g., VDD $-V_{OUT}$) as an output voltage. The lower switch 326 may provide for switching between the second voltage VSS as an input voltage and at least another of the negative feedback voltages (e.g., $-V_{OUT}$) as an output voltage.

In some cases, the switched capacitor network 322 of the voltage negator 320 may be implemented in a first voltage converter 340A or a second voltage converter 340B. As shown, the first voltage converter 340A may be configured to receive the second voltage VSS and output at least one of a positive output voltage ($V_{OUT}$) or a negative output voltage ($-V_{OUT}$). The second voltage converter 340B may be configured to receive the first voltage VDD and output at least one of the positive output voltage ($V_{OUT}$) or a sum of double (or twice or 2 times) the first voltage (2VDD) and the negative output voltage ($-V_{OUT}$).

Further, in reference to FIG. 2, the converter 200 may include a second circuit portion 212 that may be configured to receive the first and second voltages VDD, VSS along with the one or more feedback voltages (e.g., $-V_{OUT}$, VDD $-V_{OUT}$, 2VDD $-V_{OUT}$). The second circuit portion 212 may be configured to provide an output voltage $V_{OUT}$ that is proportional to the first voltage VDD based on a rational conversion ratio that may be derived by selecting (or selection of) at least one of the first and second voltages VDD, VSS, and the one or more feedback voltages (e.g., $-V_{OUT}$, VDD $-V_{OUT}$, 2VDD $-V_{OUT}$). In some cases, the second circuit portion 212 may be configured to tune the rational conversion ratio based on controlling a feedback factor and/or a forward path gain by selecting (or selection of) at least one of the first and second voltages VDD, VSS and the one or more feedback voltages (e.g., $-V_{OUT}$, VDD $-V_{OUT}$, 2VDD $-V_{OUT}$).

In some implementations, as shown in FIG. 2, the second circuit portion 212 may include one or more multiplexers (e.g., MUX-A, MUX_B, ..., MUX_N) and one or more voltage converters (e.g., 240A, 240B, ..., 240N) arranged to receive the first and second voltages VDD, VSS along with the one or more feedback voltages (e.g., $-V_{OUT}$, VDD $-V_{OUT}$, 2VDD $-V_{OUT}$). In some cases, each of the multiplexers (e.g., MUX-A, MUX_B, ..., MUX_N) may be configured for selecting at least one of the first and second voltages VSS, VDD and the one or more feedback voltages (e.g., $-V_{OUT}$, VDD $-V_{OUT}$, 2VDD $-V_{OUT}$) as an input into each of the one or more voltage converters (e.g., 240A, 240B, ..., 240N). Further, in some cases, each of the one or more voltage converters (e.g., 240A, 240B, ..., 240N) may be configured to receive the selected input from one or more of the multiplexers (e.g., MUX-A, MUX_B, ..., MUX_N) and provide the positive output voltage ($V_{OUT}$) that may be proportional to the positive source voltage VDD based on the rational conversion ratio.

In some implementations, the one or more voltage converters (e.g., 240A, 240B, ..., 240N) may include one or more switched capacitor (SC) converters. In some implementations, the one or more voltage converters (e.g., 240A, 240B, ..., 240N) may include switched capacitor (SC) DC-DC (direct current-to-direct current) converters. In some implementations, the one or more voltage converters (e.g., 240A, 240B, ..., 240N) may be configured to provide a down-conversion (e.g., 2:1) of an input voltage.

Further, in some implementations, the rational conversion ratio may be derived from the one or more multiplexors (e.g., MUX-A, MUX_B, ..., MUX_N) by selecting (or selection of) an input of at least one of the first and second voltages VDD, VSS and the one or more feedback voltages (e.g., $-V_{OUT}$, VDD $-V_{OUT}$, 2VDD $-V_{OUT}$). In some implementations, the one or more multiplexers (e.g., MUX-A, MUX_B, ..., MUX_N) and the one or more voltage converters (e.g., 240A, 240B, ..., 240N) may be arranged to tune a denominator and a numerator of the rational conversion ratio. The rational conversion ratio and derivation thereof including the numerator and the denominator are described further herein below.

Various implementations described herein refer to using negative feedback voltages in addition to voltage converters to tune a rational conversion ratio of a rational-reconfigurable DC-DC converter, such as the converter 200. For instance, by controlling a feedback factor along with forward path gain, the converter 200 may tune its denominator and its numerator to provide any desired rational conversion ratio. The configuration of the converter 200 in FIG. 2 describes various implementations of reconfiguring algorithms with one example conversion ratio of 4/13 in FIG. 4A and another example conversion ratio of 9/11 in FIG. 4B. In either case, a desired numerator and denominator may be used to configure each of the multiplexors (e.g., MUX-A, MUX_B, ..., MUX_N) by selecting (or selection of) an input voltage (e.g., VDD, VSS, $-V_{OUT}$, VDD $-V_{OUT}$, 2VDD $-V_{OUT}$) for each of the voltage converters (240A, 240B, ..., 240N). The numerator and denominator of the rational conversion ratio may be represented in binary numbers.

For instance, in reference to FIG. 2, the first and second source voltages VDD, VSS may be provided as inputs to the voltage negator 220. The voltage negator 220 may be configured to provide negative feedback voltages ($-V_{OUT}$, VDD $-V_{OUT}$, 2VDD $-V_{OUT}$) as input voltages to each of the multiplexers (e.g., MUX-A, MUX_B, ..., MUX_N). For instance, a first multiplexer MUX_may be configured to select one of the input voltages ($-V_{OUT}$, VDD $-V_{OUT}$, 2VDD $-V_{OUT}$) based on first selection enable signals $a_L, b_L$ as an input voltage to a first voltage converter 240A. A second multiplexer MUX_A may be configured to select one of the input voltages ($-V_{OUT}$, VDD $-V_{OUT}$, 2VDD $-V_{OUT}$) based on second selection enable signals $a_1, b_1$ as an input voltage to the first voltage converter 240A. The first converter 240A may receive the input voltages from the first and second multiplexers MUX_A, MUX_B and provide a first down-converted voltage $V_1$ (e.g., 2:1) to a second converter 240B. A third multiplexer MUX_B may be configured to select one of the input voltages ($-V_{OUT}$, VDD $-V_{OUT}$, 2VDD $-V_{OUT}$) based on third selection enable signals $a_2, b_2$ as an input voltage to the second voltage converter 240A. The second converter 240B may receive the first down-converted voltage $V_1$ from the first converter 240A along with the input voltage from the third multiplexer MUX_B and provide a second down-converted voltage $V_2$ (e.g., 2:1) to another or last (N) voltage converter 240N. Another or last (N) multiplexer MUX_N may be configured to select one of the input voltages ($-V_{OUT}$, VDD $-V_{OUT}$, 2VDD $-V_{OUT}$) based on another or last (N) selection enable signals $a_N, b_N$ as an input voltage to the another or last (N) voltage converter 240N. The another or last (N) voltage converter 240N may receive the second down-converted voltage $V_2$ from the second converter 240B along with the input voltage from the another or last (N) multiplexer MUX_N and provide another or last (N) down-converted voltage $V_N$ (e.g., 2:1) as the output voltage ($V_{OUT}$). In some cases, the voltage negator 220 may be configured to provide the output voltage ($V_{OUT}$).

In some implementations, the Forward Path Gain may be defined as:

$$V_{OUT}=V_N=\tfrac{1}{2}(VDD \times a_n + V_{N-1})$$

$$V_{OUT}=\tfrac{1}{2}(VDD \times a_N + \tfrac{1}{2}(VDD \times a_{N-1} + V_{N-2}))$$

$$V_{OUT}=VDD \times (a_N/2 + a_{N-1}/4 + a_{N-2}/8 + \ldots + a_1/2^N)$$

$$V_{OUT}=VDD \times (0.a_N a_{N-1} \ldots a_{1\,(2)})$$

$$V_{OUT}=VDD \times A \text{ (Forward Path Gain)}$$

In reference to the rational-reconfigurable DC-DC converter 200 FIG. 2, the Forward Path Gain (A) and Feedback Factor (B) may be defined as:

$$V_{OUT}=VDD \times A - V_{OUT} \times B = VDD \times A/(1+B)$$

As described in accordance with various implementations presented herein, the SC DC-DC converter 200 may be reconfigured to have any arbitrary rational conversion ratio: $p/q$, $0<p \le q \le 2^{N+1}$. Thus, this rational SC DC-DC converter incorporates negative voltage feedback into cascaded converter stages (i.e., voltage converters) using negative-generating converter stages (i.e., voltage negators). This enables reconfiguring of both the numerator $p$ and denominator $q$ of the rational conversion ratio. With assistance from the current supply of the voltage negators, output conductance may be maintained with a higher conversion resolution while also maintaining conversion efficiency.

In reference to the rational converter 200 of FIG. 2, one input of each 2:1 SC downconverter (e.g., voltage converters 240A, 240B, ..., 240N) may be coupled to an output of a previous stage or converter. However, the other input may be selected from among the source voltages VDD, VSS and the negative feedback voltages ($-V_{OUT}$, VDD $-V_{OUT}$, 2VDD $-V_{OUT}$) so that the output voltage $V_{OUT}$ may be determined by an equation ($V_{OUT}=A \times VDD - B \times V_{OUT}$), where A and B are referred to as the converter's forward path gain and feedback factor, respectively. In some cases, negative feedback voltage enables one or more extra choices (e.g., 3) for each converter stage, so as to increase a number of combinations and thus its reconfigurability. This allows the converter 200 to be reconfigured algorithmically to any rational conversion ratio $p/q$, $0<p \le q \le 2^{N+1}$, where N is the maximum number of 2:1 stages. Further, the negating voltage converters provide extra current into the output terminal, improving overall converter output conductance.

Figure 4A:
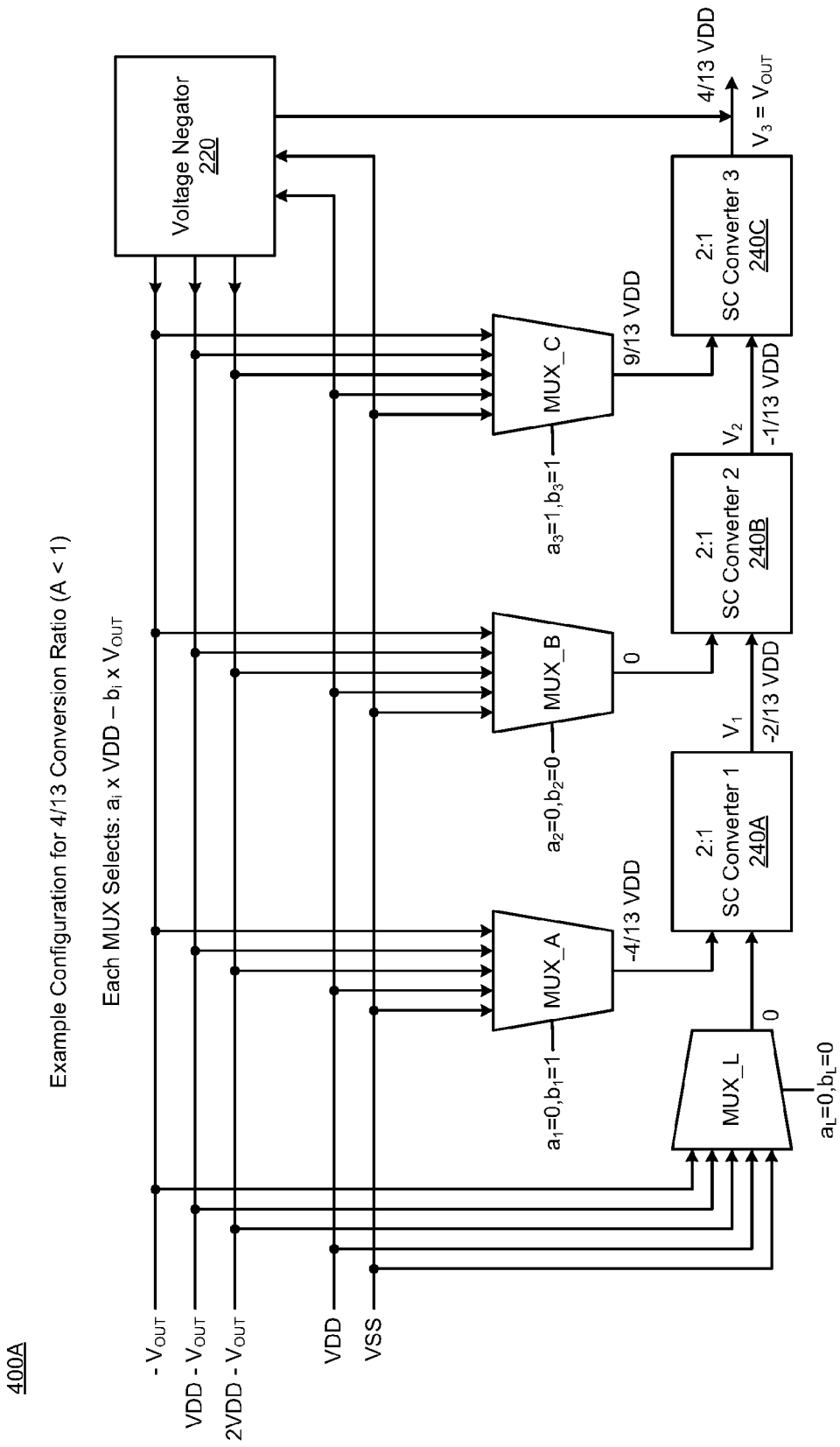
FIGS. 4A-4B illustrate various diagrams of configuring a rational conversion ratio, in accordance with various implementations described herein.
Figure 4B:
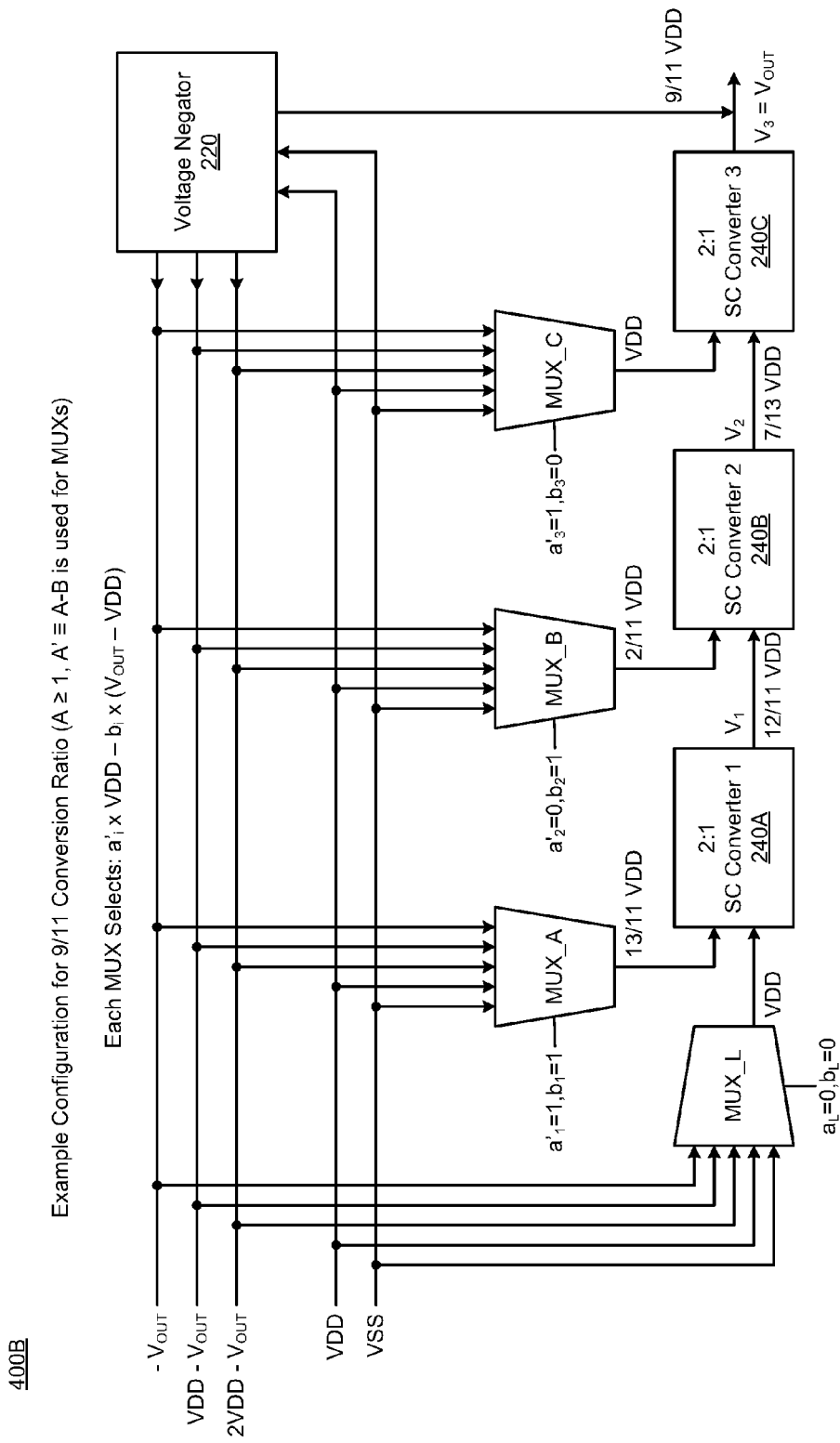

FIGS. 4A-4B illustrate various diagrams of configuring a rational conversion ratio, in accordance with various implementations described herein. In particular, FIG. 4A illustrates a diagram of a configuration 400A of the converter 200 of FIG. 2 for implementing a reconfiguring algorithm with a rational conversion ratio of 4/13, and FIG. 4B illustrates a diagram of another configuration 400B of the converter 200 of FIG. 2 for implementing another reconfiguring algorithm with a rational conversion ratio of 9/11.

In reference to FIG. 4A, the converter 200 of FIG. 2 may be configured with a rational conversion ratio of 4/13 with A<1. In this configuration 400A, each multiplexer (MUX_A, MUX_B, MUX_C) may be configured to select $a_i \times VDD - b_i \times V_{OUT}$. When the rational conversion ratio is set to $p/q=4/13$, the number of stages N is set by p and q to be three as 4/13 may be represented as a ratio of two binary fractions with three digits after the binary point, $0.100_{(2)}/1.101_{(2)}$. The numerator of this ratio becomes the forward path gain A, and the denominator minus one, $0.101_{(2)}$, becomes the feedback factor B. The input supply voltage of each stage may be selected by corresponding digits in a binary representation of A and B, i.e., $a_i$ and $b_i$. Specifically, the ith converter stage may use the ith bit from the right in A or B and may select an input voltage of $a_i \times VDD - b_i \times V_{OUT}$, which provides options of VDD, VSS, VDD −VOUT, and −VOUT. In this manner, the converter may be configured for any A and B, provided A is less than 1.

In reference to configuration 400A in FIG. 4A of the rational-reconfigurable DC-DC converter 200 FIG. 2, the Forward Path Gain (A) and Feedback Factor (B) may be defined and implemented as:

$$V_{OUT}=V_3=\tfrac{1}{2}(VDD-V_{OUT}+V_2)$$

$$V_{OUT}=\tfrac{1}{2}(VDD-V_{OUT}+\tfrac{1}{2}(0+V_1))$$

$$V_{OUT}=\tfrac{1}{2}(VDD-V_{OUT}+\tfrac{1}{2}(0+\tfrac{1}{2}(-V_{OUT}+0)))$$

$$V_{OUT}=VDD \times (1/2+0/4+0/8) - V_{OUT} \times (1/2+0/4+1/8)$$

$$V_{OUT}=VDD-0.100_{(2)}-V_{OUT} \times 0.101_{(2)}$$

Here, $A=0.100_{(2)}$ and $B=0.101_{(2)}$ $$V_{OUT}=VDD \times A/(1+B)=VDD \times 4/13$$

In reference to FIG. 4B, the converter 200 of FIG. 2 may be configured with another rational conversion ratio of 9/11 with $A \ge 1$, $A' \equiv A-B$ is used for MUXs. In this configuration 400B, each multiplexer (MUX_A, MUX_B, MUX_C) may be configured to select $a'_i \times VDD - b_i \times (V_{OUT}-VDD)$. For $A \ge 1$, the voltage negators may be reconfigured to generate VDD −VOUT and 2VDD −VOUT. For instance, when the conversion ratio $p/q$ is set to 9/11, N is set to three as $9/11=1.001_{(2)}/1.011_{(2)}$, and A is $1.001_{(2)}$ and B is $0.011_{(2)}$ accordingly. With the change in the voltage negator configuration, the voltage selection signal for forward path gain is also changed into a new value $A'=A-B$, which may be less than 1, if $p<q$. To compensate for a reduction in forward path gain by B, extra VDD is added whenever $b_i$ is 1 by selecting $a'_i \times VDD - b_i \times (V_{OUT}-VDD)$ among VDD, VSS, VDD −VOUT, and 2VDD −VOUT. In case of $p/q=9/11$, A' becomes $A-B=0.110_{(2)}$, which may be realized in the converter by setting $a'_L=1$, $a'_1=1$, $a'_2=0$, and $a'_3=1$, since this configuration may offer lower bottom-plate parasitic switching loss than setting $a'_L=0$, and setting $a'_1$, $a'_2$, and $a'_3$ to 0, 1, 1, respectively.

In reference to configuration 400B in FIG. 4B of the rational-reconfigurable DC-DC converter 200 FIG. 2, the Forward Path Gain (A) and Feedback Factor (B) may be defined and implemented as:

$$V_{OUT}=V_3=\tfrac{1}{2}(VDD+V_2)$$

$$V_{OUT}=\tfrac{1}{2}(VDD+\tfrac{1}{2}(VDD-V_{OUT}+V_1))$$

Figure 5:
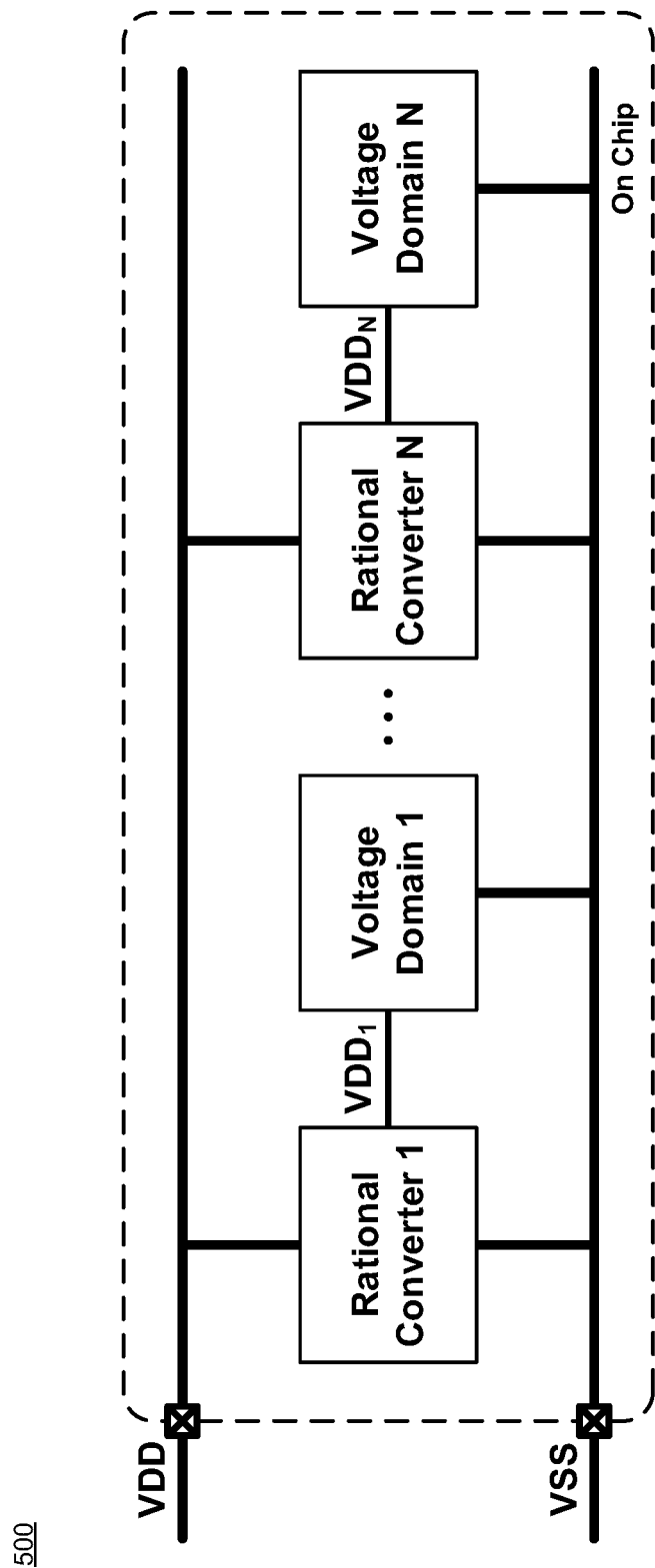
FIG. 5 illustrates a high level diagram of rational DC-DC converters powering multiple voltage domains, in accordance with various implementations described herein.

$V_{OUT}=\frac{1}{2}(VDD+\frac{1}{2}(VDD-V_{OUT}+\frac{1}{2}(2VDD-V_{OUT}+VDD)))$ $V_{OUT}=VDD\times(1/2+1/4+2/8+1/8)-V_{OUT}\times(0/2+1/4+1/8)$ $V_{OUT}=VDD\times1.001_{(2)}-VOUT\times0.011_{(2)}$ Here, A=$1.001_{(2)}$ and B=$0.011_{(2)}$ $V_{OUT}=VDD\times A/(1+B)=VDD\times9/11$ $VDD\times A\times V_{OUT}\times B$ $VDD\times(A-B)-(V_{OUT}-VDD)\times B$ $A'=A-B=0.110_{(2)}=(0.101_{(2)}+0.001_{(2)})$ FIG. 5 illustrates a high level structural diagram of rational DC-DC converters 500 that may be configured to power multiple voltage domains, in accordance with various implementations described herein.

Switched-capacitor (SC) DC-DC converters may have several advantages over conventional inductive DC-DC converters in that they are easily integrated on-chip and may be scaled to desired power levels, thus rendering themselves promising for various integrated voltage regulators, especially for small, low-power systems. This is particularly applicable in wireless systems where battery voltage degrades slowly.

The rational converter described herein offers many conversion ratios due to both numerator and denominator being selectable, and this number increases faster than binary converters as more stages are cascaded. Many of these non-binary ratio configurations have higher conductance than binary configurations for similar voltages, and thus, lower conduction loss. For each configuration, the rational converter may have an output conductance of $I_{OUT}/\Delta V = C_{FLY}F_{CLK}\times q^2/(q-1)^2$, when assuming the output is a DC voltage, which marks improved conductance among SC converters that do not include inductors. Further, the flexibility in selecting $a_L$ and $b_L$ in the first stage (or first voltage converter) may be used to reduce bottom plate swing in some rational conversion ratios, thus possibly further lowering bottom plate switching loss. Therefore, a rational converter may provide higher or at least equal efficiency relative to a conventional binary converter over an entire output voltage range.

Figure 6:
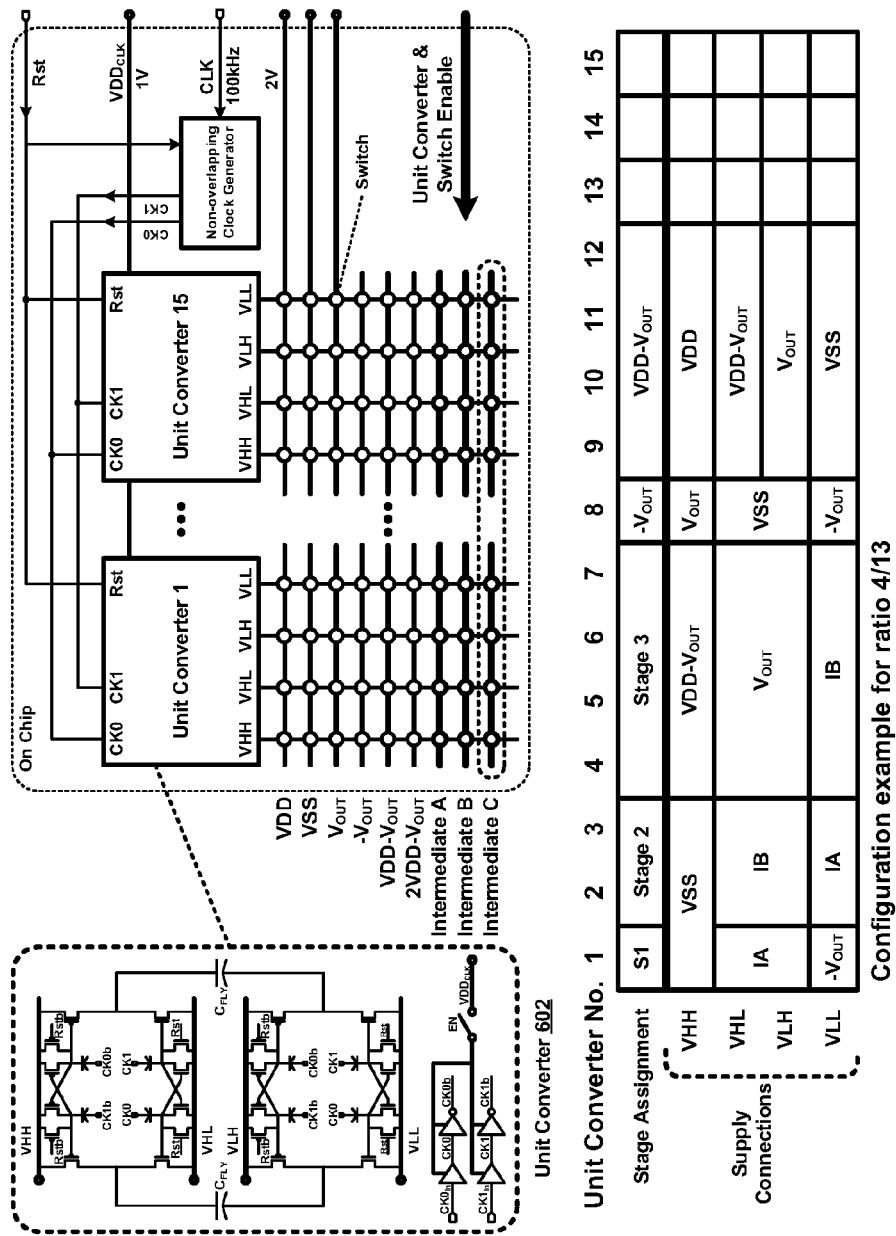
FIG. 6 illustrates a high-level diagram of a reconfigurable DC-DC converter, in accordance with various implementations described herein.

FIG. 6 illustrates a high-level structural diagram of a reconfigurable SC DC-DC converter 600, in accordance with various implementations described herein.

The reconfigurable SC DC-DC converter 600 may include 15 unit converters 602 that may be configured to form a 4-stage converter with 15 ratio configurations (p/24, 0<p<24), a few-ratio converter with 1/3 and 2/5 ratios, or an up to 3-stage rational converter with 79 ratio configurations (p/q, 0<p<q≤24), with relative sizing among stages for optimal normalized conductance. As shown, the unit converter may include a 2-phase SC converter with four terminals that may be a 2:1 converter or a voltage negator. Each terminal may be coupled to arbitrary voltage sources, including, e.g., VDD, VSS, $V_{OUT}$, multiple negative feedback voltages, and multiple intermediate voltages (e.g., 3) for inter-stage connections. Despite a large number of reconfiguration switches, these switches may not impact efficiency as they may form multiple connections among DC voltages and, hence, may not contribute additional switching loss. The rational SC DC-DC converter has more ratios and higher conversion efficiency than conventional binary converters.

Figure 7:
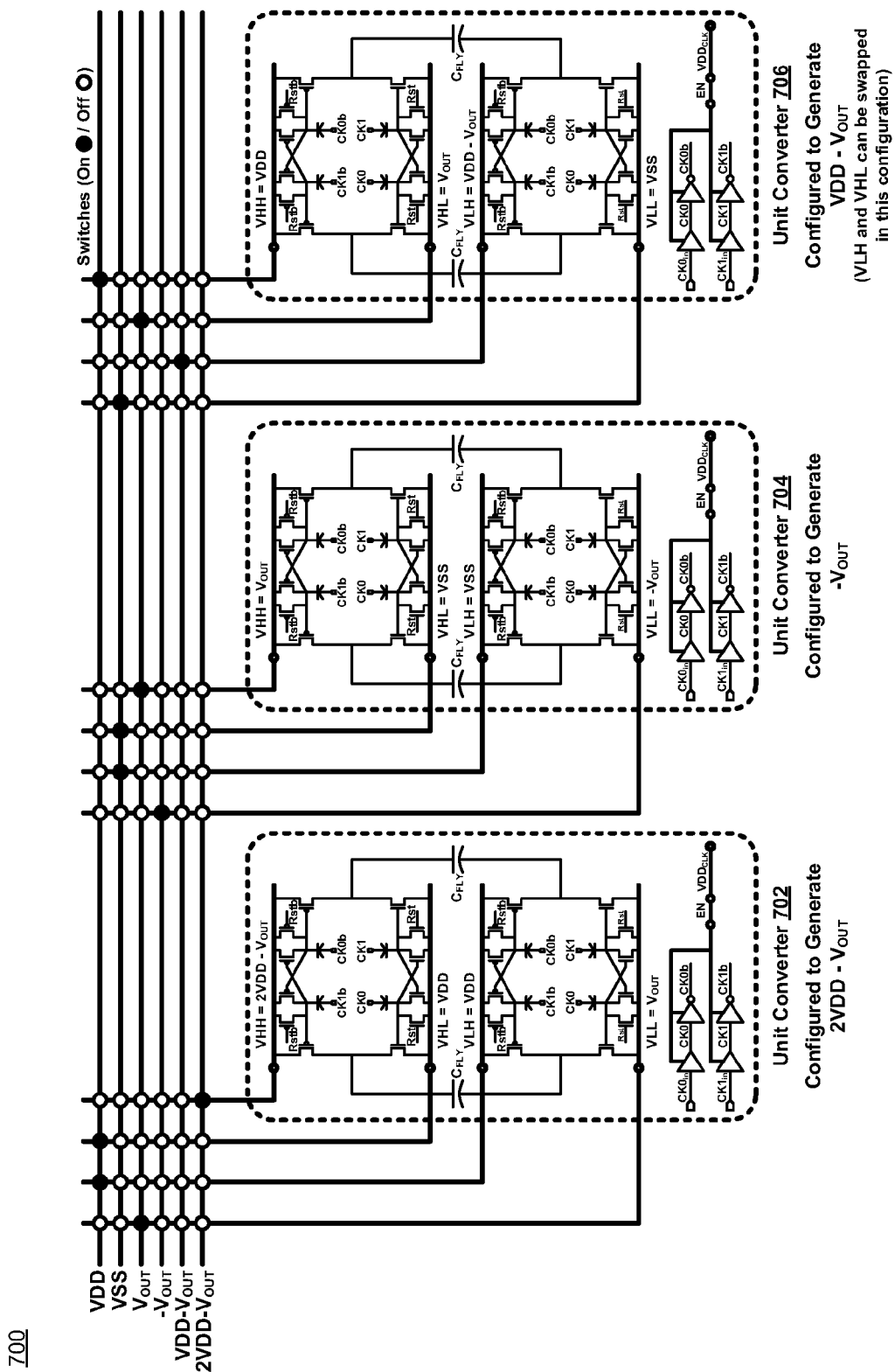
FIG. 7 illustrates a high-level diagram of voltage negator, in accordance with various implementations described herein.

FIG. 7 illustrates a high-level structural diagram of voltage negators 700, in accordance with various implementations described herein.

As shown in reference to FIG. 7, the voltage negators 700 may be configured to receive first and second voltages VDD, VSS as input voltages and provide various output voltages $V_{OUT}$, $-V_{OUT}$, VDD $-V_{OUT}$, and 2VDD $-V_{OUT}$. For instance, the voltage negators 700 may include a unit converter 702 that is configured to receive input voltages VDD, VSS and generate a feedback voltage of 2VDD $-V_{OUT}$. The voltage negators 700 may include another unit converter 704 that is configured to receive input voltages VDD, VSS and generate another feedback voltage of $-V_{OUT}$. Further, the voltage negators 700 may include another unit converter 706 that is configured to receive input voltages VDD, VSS and generate another feedback voltage of VDD $-V_{OUT}$.

Figure 8:
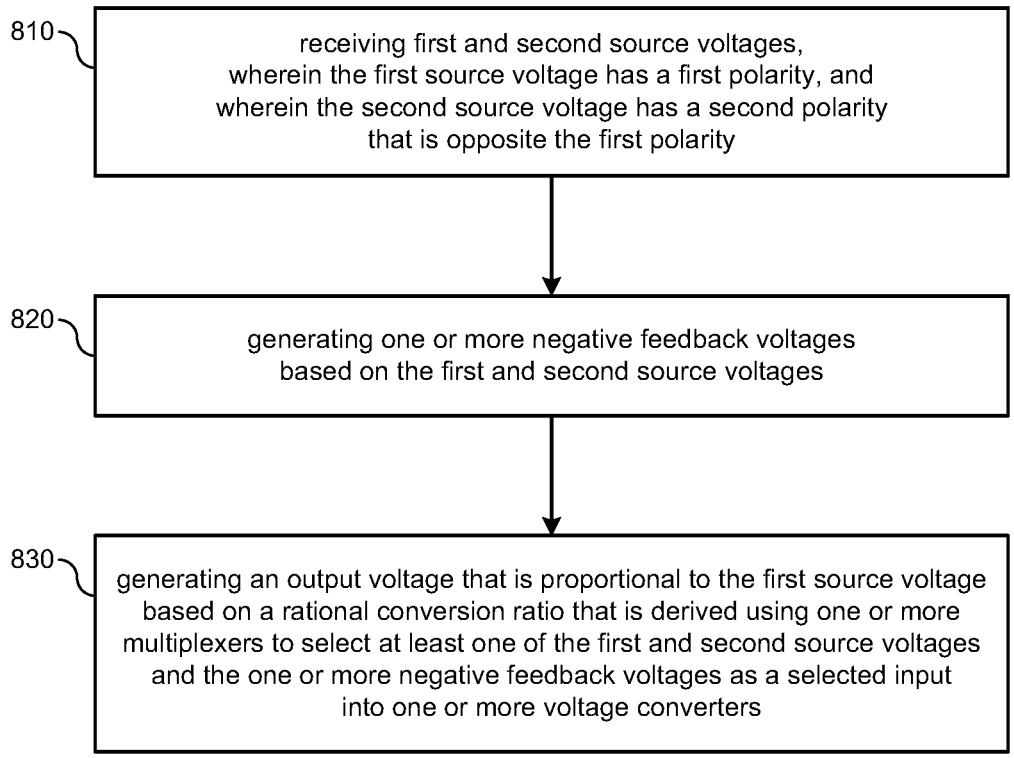
FIG. 8 illustrates a method for providing a rational conversion ratio, in accordance with various implementations described herein.

FIG. 8 illustrates a method 800 for providing a rational conversion ratio, in accordance with various implementations described herein.

It should be understood that even though method 800 may indicate a particular order of execution of operations, in some instances, various certain portions of the operations may be executed in a different order, and on different systems. In some other instances, additional operations or steps may be added to and/or omitted from method 800. The method 800 may be implemented in hardware and/or software. If implemented in software, the method 800 may be implemented as a program or software instruction process that is configured for providing a rational conversion ratio. Further, if implemented in software, instructions related to implementing the method 800 may be stored in memory and/or a database. For instance, a computer or various other computing devices having a processor and memory may be configured to perform method 800. If implemented in hardware, the method 800 may be implemented with various types of circuit components, such as described herein above in reference to FIGS. 2-7.

At block 810, method 800 may receive first and second source voltages. In some cases, the first source voltage may have a first polarity, and the second source voltage may have a second polarity that is opposite the first polarity. For instance, the first source voltage may be a positive voltage having a positive polarity, and the second source voltage may be a negative voltage having a negative polarity. In other instances, the first source voltage may be a positive voltage having a positive polarity, and the second source voltage may be at or near a ground voltage (GND). In this instance, the second source voltage may be a positive or negative voltage having a positive or negative polarity with a magnitude near zero volts (0V).

At block 820, method 800 may generate one or more negative feedback voltages based on the first and second source voltages. In some instances, the one or more negative feedback voltages may include a first negative feedback voltage that is similar to a negative output voltage, wherein the negative output voltage has a magnitude similar to the positive output voltage with an opposite polarity. In some instances, the one or more negative feedback voltages may include a second negative feedback voltage that is a sum of the positive source voltage and a negative output voltage, wherein the negative output voltage has a magnitude similar to the positive output voltage with an opposite polarity. In some instances, the one or more negative feedback voltages may include a third negative feedback voltage that is a sum of double the positive source voltage and a negative output voltage, wherein the negative output voltage has a magnitude similar to the positive output voltage with an opposite polarity.

At block 830, method 800 may generate an output voltage that is proportional to the first source voltage based on a rational conversion ratio that is derived using one or more multiplexers to select at least one of the first and second source voltages and the one or more negative feedback voltages as a selected input into one or more voltage converters. In some cases, each of the one or more voltage converters may be configured to receive the selected input and provide the output voltage that is proportional to the positive source voltage based on the rational conversion ratio. In some cases, the one or more multiplexers and the one or more voltage converters may be arranged to tune the rational conversion ratio based on controlling a feedback factor and a forward path gain by selecting (or selection of) the at least one of the first and second source voltages and the one or more negative feedback voltages. In some cases, the one or more multiplexers and the one or more voltage converters may be arranged to tune a denominator and a numerator of the rational conversion ratio. Further, as described herein, the one or more voltage converters may include one or more switched capacitor (SC) converters, and in some cases, the one or more SC converters may include SC DC-DC converters.

Described herein are various implementations of an integrated circuit. The integrated circuit may include a first voltage source providing a first voltage having a first polarity. The integrated circuit may include a second voltage source providing a second voltage having a second polarity that is opposite the first polarity. The integrated circuit may include a first circuit portion configured to receive the first and second voltages and provide one or more feedback voltages. The integrated circuit may include a second circuit portion configured to receive the first and second voltages along with the one or more feedback voltages and provide an output voltage that is proportional to the first voltage based on a rational conversion ratio that is derived by selection of at least one of the first and second voltages and the one or more feedback voltages.

The first polarity may include a positive polarity, and the second polarity may include a negative polarity. The one or more feedback voltages may include one or more negative feedback voltages, and the first circuit portion may include a voltage negator configured to receive the first and second voltages and provide the one or more negative feedback voltages. The second circuit portion may be configured to tune the rational conversion ratio based on controlling a feedback factor and a forward path gain by the selection of the at least one of the first and second voltages and the one or more feedback voltages. The second circuit portion may include one or more multiplexers and one or more voltage converters arranged to receive the first and second voltages along with the one or more feedback voltages. Each of the multiplexers may be configured for the selection of the at least one of the first and second voltages and the one or more feedback voltages as an input into each of the one or more voltage converters. The rational conversion ratio may be derived from the one or more multiplexors by the selection of the at least one of the first and second voltages and the one or more feedback voltages. The one or more multiplexers and the one or more voltage converters may be arranged to tune a denominator and a numerator of the rational conversion ratio. The one or more voltage converters may include one or more switched capacitor (SC) converters. The one or more voltage converters may include switched capacitor (SC) DC-DC (direct current-to-direct current) converters.

Described herein are various implementations of a device for generating any arbitrary rational conversion ratio. The device may include a voltage negator configured to receive positive and negative source voltages and provide one or more negative feedback voltages. The device may include one or more multiplexers and one or more voltage converters arranged to receive the positive and negative source voltages along with the one or more negative feedback voltages and provide a positive output voltage that is proportional to the positive source voltage based on a rational conversion ratio. The rational conversion ratio may be derived from the multiplexors by selecting at least one of the first and second voltages and the one or more negative feedback voltages as a selected input into each of the one or more voltage converters.

Each of the one or more voltage converters may be configured to receive the selected input and provide the positive output voltage that is proportional to the positive source voltage based on the rational conversion ratio. The one or more negative feedback voltages may include a first negative feedback voltage that is similar to a negative output voltage, and the negative output voltage may have a magnitude similar to the positive output voltage with an opposite polarity. The one or more negative feedback voltages may include a second negative feedback voltage that is a sum of the positive source voltage and a negative output voltage, and the negative output voltage may have a magnitude similar to the positive output voltage with an opposite polarity. The one or more negative feedback voltages may include a third negative feedback voltage that is a sum of double the positive source voltage and a negative output voltage, and the negative output voltage may have a magnitude similar to the positive output voltage with an opposite polarity.

Described herein are various implementations of a method for generating any arbitrary rational conversion ratio. The method may include receiving first and second source voltages, wherein the first source voltage may have a first polarity, and the second source voltage may have a second polarity that is opposite the first polarity. The method may include generating one or more negative feedback voltages based on the first and second source voltages. Further, the method may include generating an output voltage that is proportional to the first source voltage based on a rational conversion ratio that is derived using one or more multiplexers to select at least one of the first and second source voltages and the one or more negative feedback voltages as a selected input into one or more voltage converters.

The first polarity may include a positive polarity, and the second polarity may include a negative polarity. Each of the one or more voltage converters may be configured to receive the selected input and provide the output voltage that is proportional to the positive source voltage based on the rational conversion ratio. The one or more multiplexers and the one or more voltage converters may be arranged to tune the rational conversion ratio based on controlling a feedback factor and a forward path gain by selecting the at least one of the first and second source voltages and the one or more negative feedback voltages. The one or more multiplexers and the one or more voltage converters may be arranged to tune a denominator and a numerator of the rational conversion ratio.

Implementations of various technologies described herein may be operational with numerous general purpose or special purpose computing system environments or configurations. Examples of computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in the general context of computer-executable instructions, such as program modules, being executed by a computer. Program modules include routines, programs, objects, components, data structures, etc. that perform particular tasks or implement particular abstract data types. Further, each program module may be implemented in its own way, and all need not be implemented the same way. While program modules may execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or some combination of both.

The various technologies described herein may be implemented in distributed computing environments where tasks are performed by remote processing devices that are linked through a communications network, e.g., by hardwired links, wireless links, or various combinations thereof. In a distributed computing environment, program modules may be located in both local and remote computer storage media including, for example, memory storage devices and similar.

Further, the discussion provided herein may be considered directed to certain specific implementations. It should be understood that the discussion provided herein is provided for the purpose of enabling a person with ordinary skill in the art to make and use any subject matter defined herein by the subject matter of the claims.

It should be intended that the subject matter of the claims not be limited to the implementations and illustrations provided herein, but include modified forms of those implementations including portions of implementations and combinations of elements of different implementations in accordance with the claims. It should be appreciated that in the development of any such implementation, as in any engineering or design project, numerous implementation-specific decisions should be made to achieve developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Reference has been made in detail to various implementations, examples of which are illustrated in the accompanying drawings and figures. In the following detailed description, numerous specific details are set forth to provide a thorough understanding of the disclosure provided herein. However, the disclosure provided herein may be practiced without these specific details. In some other instances, well-known methods, procedures, components, circuits and networks have not been described in detail so as not to unnecessarily obscure details of the embodiments.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised in accordance with the disclosure herein, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An integrated circuit, comprising:
a first voltage source providing a first voltage having a first polarity;
a second voltage source providing a second voltage having a second polarity that is opposite the first polarity;
a first circuit portion including a first voltage negator, wherein the first voltage negator is configured to receive the first and second voltages and provide one or more feedback voltages, wherein the one or more feedback voltages comprise one or more negative feedback voltages; and
a second circuit portion to receive the first and second voltages along with the one or more feedback voltages and provide an output voltage that is proportional to the first voltage based on a rational conversion ratio that is derived by selection of either the first voltage or the second voltage and the one or more feedback voltages.

2. The integrated circuit of claim 1, wherein the first polarity comprises a positive polarity, and wherein the second polarity comprises a negative polarity.

3. The integrated circuit of claim 1, wherein the second circuit portion is configured to tune the rational conversion ratio based on controlling a feedback factor and a forward path gain by the selection of the either the first voltage or the second voltage and the one or more feedback voltages.

4. The integrated circuit of claim 1, wherein the second circuit portion includes one or more multiplexers and one or more voltage converters arranged to receive the first and second voltages along with the one or more feedback voltages.

5. The integrated circuit of claim 4, wherein each of the multiplexers are configured for the selection of the either the first voltage or the second voltage and the one or more feedback voltages as an input into each of the one or more voltage converters.

6. The integrated circuit of claim 4, wherein the rational conversion ratio is derived from the one or more multiplexers by the selection of the either the first voltage or the second voltage and the one or more feedback voltages.

7. The integrated circuit of claim 4, wherein the one or more multiplexers and the one or more voltage converters are arranged to tune a denominator and a numerator of the rational conversion ratio.

8. The integrated circuit of claim 4, wherein the one or more voltage converters comprise one or more switched capacitor (SC) converters.

9. The integrated circuit of claim 4, wherein the one or more voltage converters comprise switched capacitor (SC) DC-DC (direct current-to-direct current) converters.

10. A device, comprising:
a voltage negator to receive positive and negative source voltages and provide one or more negative feedback voltages; and
one or more multiplexers and one or more voltage converters arranged to receive the positive and negative source voltages along with the one or more negative feedback voltages and provide a positive output voltage that is proportional to the positive source voltage based on a rational conversion ratio,
wherein the rational conversion ratio is derived from the multiplexers by selecting either the first voltage or the second voltage and the one or more negative feedback voltages as a selected input into each of the one or more voltage converters.

11. The device of claim 10, wherein each of the one or more voltage converters are configured to receive the selected input and provide the positive output voltage that is proportional to the positive source voltage based on the rational conversion ratio.

12. The device of claim 10, wherein the one or more negative feedback voltages include a first negative feedback voltage that is similar to a negative output voltage, wherein the negative output voltage has a magnitude similar to the positive output voltage with an opposite polarity.

13. The device of claim 10, wherein the one or more negative feedback voltages include a second negative feedback voltage that is a sum of the positive source voltage and a negative output voltage, wherein the negative output voltage has a magnitude similar to the positive output voltage with an opposite polarity.

14. The device of claim 10, wherein the one or more negative feedback voltages include a third negative feedback voltage that is a sum of double the positive source voltage and a negative output voltage, wherein the negative output voltage has a magnitude similar to the positive output voltage with an opposite polarity.

15. A method, comprising:
receiving first and second source voltages, wherein the first source voltage has a first polarity, and wherein the second source voltage has a second polarity that is opposite the first polarity;
generating one or more negative feedback voltages based on the first and second source voltages; and
generating an output voltage that is proportional to the first source voltage based on a rational conversion ratio that is derived using one or more multiplexers to select either the first or second source voltages and the one or more negative feedback voltages as a selected input into one or more voltage converters,
wherein the one or more multiplexers and the one or more voltage converters are arranged to tune a denominator and a numerator of the rational conversion ratio.

16. The method of claim 15, wherein the first polarity comprises a positive polarity, and wherein the second polarity comprises a negative polarity.

17. The method of claim 15, wherein each of the one or more voltage converters are configured to receive the selected input and provide the output voltage that is proportional to the positive source voltage based on the rational conversion ratio.

18. A method, comprising:
receiving first and second source voltages, wherein the first source voltage has a first polarity, and wherein the second source voltage has a second polarity that is opposite the first polarity;
generating one or more negative feedback voltages based on the first and second source voltages; and
generating an output voltage that is proportional to the first source voltage based on a rational conversion ratio that is derived using one or more multiplexers to select either the first or second source voltages and the one or more negative feedback voltages as a selected input into one or more voltage converters,
wherein the one or more multiplexers and the one or more voltage converters are arranged to tune the rational conversion ratio based on controlling a feedback factor and a forward path gain by selecting either the first or second source voltages and the one or more negative feedback voltages.

19. The method of claim 18, wherein the first polarity comprises a positive polarity, and wherein the second polarity comprises a negative polarity.

20. The method of claim 18, wherein each of the one or more voltage converters are configured to receive the selected input and provide the output voltage that is proportional to the positive source voltage based on the rational conversion ratio.

* * * * *